United States Patent
Broyde et al.

(10) Patent No.: US 8,599,872 B2
(45) Date of Patent: Dec. 3, 2013

(54) MULTICHANNEL INTERFACING DEVICE HAVING A SWITCHING CIRCUIT

(75) Inventors: Frederic Broyde, Maule (FR); Evelyne Clavelier, Maule (FR)

(73) Assignee: EXCEM, Maule (FR)

( * ) Notice: Subject to any disclaimer, the term of this patent is extended or adjusted under 35 U.S.C. 154(b) by 433 days.

(21) Appl. No.: 13/074,453

(22) Filed: Mar. 29, 2011

(65) Prior Publication Data

US 2011/0176558 A1 Jul. 21, 2011

Related U.S. Application Data

(63) Continuation-in-part of application No. PCT/IB2009/055287, filed on Nov. 23, 2009.

(30) Foreign Application Priority Data

Jan. 8, 2009 (FR) ...................................... 09 00042

(51) Int. Cl.
*H04L 12/66* (2006.01)

(52) U.S. Cl.
USPC .......................................................... 370/463

(58) Field of Classification Search
None
See application file for complete search history.

(56) References Cited

U.S. PATENT DOCUMENTS

| | | | |
|---|---|---|---|
| 5,638,322 A | 6/1997 | Lacey | |
| 5,896,417 A * | 4/1999 | Lau | 370/463 |
| 6,580,720 B1 * | 6/2003 | Francis et al. | 370/423 |
| 7,081,762 B2 * | 7/2006 | McNitt et al. | 370/201 |
| 7,450,535 B2 * | 11/2008 | Best | 370/314 |
| 7,876,767 B2 * | 1/2011 | Binder | 370/420 |
| 2005/0018596 A1 * | 1/2005 | Washburn et al. | 370/201 |
| 2005/0030884 A1 * | 2/2005 | Kim et al. | 370/201 |
| 2006/0267633 A1 | 11/2006 | King | |
| 2010/0039923 A1 * | 2/2010 | Kim et al. | 370/201 |
| 2011/0069604 A1 * | 3/2011 | Schmukler et al. | 370/201 |

FOREIGN PATENT DOCUMENTS

| | | |
|---|---|---|
| WO | 2004/062129 | 7/2004 |
| WO | 2004/079941 | 9/2004 |
| WO | 2004/082168 | 9/2004 |
| WO | 2009/013644 | 1/2009 |

OTHER PUBLICATIONS

Carusone et al., "Differential Signaling With a Reduced Number of Signal Paths", IEEE Transactions on Circuits and Systems, Analog and Digital Signal Processing, vol. 48, No. 3, Mar. 2001.

Johnson, Ph.D., et al., "High-Speed Digital Design a Handbook of Black Magic", published by Prentice Hall PTR in 1993.

(Continued)

*Primary Examiner* — Anh-Vu Ly
(74) *Attorney, Agent, or Firm* — Barnes & Thornburg LLP

(57) ABSTRACT

The invention relates to an interfacing device for transmission through interconnections used for sending a plurality of electrical signals. The interfacing device of the invention comprises signal terminals and a common terminal. A transmitting circuit receives the input signals of the transmitting circuit coming from a source. The output of the transmitting circuit delivers, when the transmitting circuit is in the activated state, voltages between one of the signal terminals and the reference terminal (ground). A receiving circuit delivers, when the receiving circuit is in the activated state, output signals of the receiving circuit determined each by the voltage between one of the signal terminals and the common terminal, to the destination. In the closed state, the common terminal switching circuit is, for the common terminal, equivalent to a voltage source delivering a constant voltage, connected in series with a passive two-terminal circuit element presenting a low impedance.

12 Claims, 5 Drawing Sheets

(56) References Cited

OTHER PUBLICATIONS

Broyde et al., "A New Pseudo-Differential Transmission Scheme for On-Chip and On-Board Interconnections", Proc. of the CEM 08 Int. Symp. On Electromagnetic Compatibility, May 2008.

Broyde et al., "Pseudo-Differential Links Using a Wide Return Conductor and a Floating Termination Circuit," Proceedings of the 08 IEEE International Midwest Symposium on Circuits and Systems, Aug. 2008.

* cited by examiner

MULTICHANNEL INTERFACING DEVICE HAVING A SWITCHING CIRCUIT

CROSS REFERENCE TO RELATED APPLICATIONS

This is a Continuation Application of PCT application PCT/IB2009/055287, filed 23 Nov. 2009, published in English under No. WO 2010/079390, which in turn claims priority to French patent application Ser. No. 09/00042 filed 8 Jan. 2009 and entitled "Dispositif d'interface multicanal avec circuit de commutation", both of which are incorporated herein by reference.

FIELD OF THE INVENTION

The invention relates to an interfacing device for transmission through interconnections used for sending a plurality of electrical signals, such as the interconnections made with multiconductor cables, or with the traces of a printed circuit board, or inside an integrated circuit.

PRIOR ART

Let us consider the problem of transmission through an interconnection, for obtaining m transmission channels, m being an integer greater than or equal to 2. Each transmission channel may be used for transmitting signals of any type, for instance analog signals or digital signals, from a source to a destination. We consider here that a digital signal is a signal whose value is defined only at discrete points in time, the set of the values that the signal may take on being discrete. We consider also that each value of a digital signal corresponds to a voltage or current interval. This definition of a digital signal as a "digital signal defined by voltage or current intervals" includes:

the binary signals used in binary signaling, that is to say any signal such that, in each transmission channel, the set of the values that this signal may take on has 2 elements;

the N-ary signals (N being an integer greater than or equal to 3) used in multilevel signaling, that is to say any signal such that, in each transmission channel, the set of the values that this signal may take on has N elements.

Binary signals are the signals which are the most frequently used today by digital integrated circuits. Multilevel signals, for instance quaternary signals (sometimes referred to as PAM-4 or 4-PAM), are used to obtain high bit rates. We will consider that any signal which does not comply with this definition of a digital signal is an analog signal. Thus, the result of any type of modulation of a carrier by a digital signal will be regarded as an analog signal.

Said transmission may be obtained through an interconnection comprising m+1 conductors, among which m transmission conductors. We shall consider three transmission impairments: echo, internal crosstalk and external crosstalk. Internal crosstalk refers to crosstalk within the interconnection, between the different transmission channels. External crosstalk refers to crosstalk involving couplings between the interconnection and the external world.

The simplest transmission method for obtaining m transmission channels uses m single-ended links. Using m single-ended links, each transmission channel uses one transmission conductor of the interconnection. In this method, echo may be reduced (but not canceled) using a suitable termination. It is well known that this method is subject to internal crosstalk.

The prior art concerning transmission without echo and without internal crosstalk is set out in the 3 following patents:

the French patent number 0300064 of 6 Jan. 2003 entitled "Procédé et dispositif pour la transmission avec une faible diaphonie", corresponding to the international application number PCT/EP2003/015036 of 24 Dec. 2003 (WO 2004/062129), entitled "Method and device for transmission with reduced crosstalk";

the French patent number 0302814 of 6 Mar. 2003 entitled "P rocédé et dispositif numériques pour la transmission avec une faible diaphonie", corresponding to the international application number PCT/EP2004/002382 of 18 Feb. 2004 (WO 2004/079941), entitled "Digital method and device for transmission with reduced crosstalk";

the French patent number 0303087 of 13 Mar. 2003 entitled "P rocédé et dispositif pour la transmission sans diaphonie", corresponding to the international application number PCT/EP2004/002383 of 18 Feb. 2004 (WO 2004/082168), entitled "Method and device for transmission without crosstalk".

As explained in the prior art section of the French patent application Ser. No. 07/05260 of 20 Jul. 2007 entitled "P rocédé et dispositif pour les transmissions pseudo-différentielles", corresponding to the international application number PCT/IB2008/052102 of 29 May 2008 (WO 2009/013644), entitled "Method and device for pseudo-differential transmission", a transmission scheme using the reference conductor, which is often called the ground conductor, as a return path for the return current produced by the currents flowing in the transmission conductors, often suffers from a strong coupling between said transmission channels and some loops including a path in the reference conductor. This particular case of external crosstalk is sometimes called "ground noise" or "ground bounce".

If the interconnection is used for building m single-ended links, the reference conductor (ground) is used for the return current produced by the currents flowing on the m transmission conductors. This scheme is consequently vulnerable to external crosstalk (it is also subject to internal crosstalk).

If the interconnection is used according to one of the inventions described in said French patents number 0300064, number 0302814 and number 0303087 and the corresponding international applications, the reference conductor (ground) is also used for the return current produced by the currents flowing on the m transmission conductors. These inventions, which are suitable for reducing or eliminating internal crosstalk, are therefore prone to external crosstalk.

However, there are transmission methods intended to provide a good protection against external crosstalk: differential links (see for instance the book of H. W. Johnson and M. Graham entitled *High-speed digital design: a handbook of black magic*, published by Prentice Hall PTR in 1993), and pseudo-differential links (see for instance the section II of the paper of A. Carusone, K. Farzan and D. A. Johns entitled "Differential signaling with a reduced number of signal paths" published in *IEEE Transactions on Circuits and Systems II*, vol. 48, No. 3, pp. 294-300 in March 2001 and the section 4.2.3 of the book of F. Yuan entitled *CMOS current-mode circuits for data communications*, published by Springer in 2007).

A differential device for transmission providing m transmission channels uses an interconnection having n=2m transmission conductors. A pseudo-differential device for transmission providing m transmission channels uses an interconnection having n=m transmission conductors and a common conductor distinct from the reference conductor (ground). The common conductor is referred to as "return conductor" in the case of the pseudo-differential transmission scheme disclosed in said French patent application Ser. No. 07/05260 and the corresponding international application.

It should be noted that the wording "pseudo-differential" is also applied to devices which are not related in any way to pseudo-differential transmission. For instance, the patent application number US 2006/0267633 of the United States of America entitled "Pseudo-differential output driver with high immunity to noise and jitter" relates to a device having one differential input channel and one single-ended output channel: this device is not related to pseudo-differential transmission in any way. For instance, the U.S. Pat. No. 5,638,322 of the United States of America entitled "Apparatus and method for improving common mode noise rejection in pseudo-differential sense amplifiers" relates to sense amplifiers which to some extent look like conventional differential amplifiers: this invention is not related to pseudo-differential transmission in any way.

The method disclosed in said French patent application Ser. No. 07/05260 and the corresponding international application is very effective for reducing external crosstalk and echo. However, this method does not reduce internal crosstalk. For instance, the article of F. Broydé and E. Clavelier entitled "A new pseudo-differential transmission scheme for on-chip and on-board interconnections" published in the proceedings of the "$14^{\text{ème}}$ colloque international sur la compatibilité électromagnétique—CEM 08", which took place in Paris, France, in May 2008, shows that this method does not provide a reduction of internal crosstalk. For instance, the article of F. Broydé and E. Clavelier entitled "Pseudo-differential links using a wide return conductor and a floating termination circuit", published in the proceedings of the "2008 IEEE International Midwest Symposium on Circuits and Systems (MWSCAS)", which took place in Knoxville, Tenn., in the United States of America, in August 2008, also indicates that internal crosstalk is present in a pseudo-differential link using the method of said French patent application Ser. No. 07/05260 and the corresponding international application.

Conversely, as explained above, the inventions described in said French patents number 0300064, number 0302814 and number 0303087 and the corresponding international applications are suitable for removing internal crosstalk and echo, but they do not reduce external crosstalk.

The French patent application Ser. No. 08/03985 of 11 Jul. 2008, entitled "Dispositif d'interface multicanal avec circuit d'equilibrage", corresponding to the international application number PCT/IB2009/051557 of 14 Apr. 2009, entitled "Multichannel interfacing device having a balancing circuit", describes an interfacing device which may take the place of a transmitting circuit used in one of the devices described in said French patents number 0300064, number 0302814 and number 0303087, and the corresponding international applications, and may thereby provide a reduction of external crosstalk. However, this interfacing device does not reduce the external crosstalk occurring in the interconnection.

The French patent application Ser. No. 08/04429 of 4 Aug. 2008, entitled "Procédé de transmission pseudo-différentiel utilisant des variables électriques modales", corresponding to the international application number PCT/IB2009/052638 of 19 Jun. 2009, entitled "Method for pseudo-differential transmission using modal electrical variables", and the French patent application Ser. No. 08/04430 of 4 Aug. 2008, entitled "Procédé de transmission pseudo-différentiel utilisant des variables électriques naturelles", corresponding to the international application number PCT/IB2009/052645 of 19 Jun. 2009, entitled "Method for pseudo-differential transmission using natural electrical variables", describe pseudo-differential devices for transmission which may be used to reduce echo, internal crosstalk and external crosstalk. Such a pseudo-differential device for transmission is shown in FIG. 1, this device comprising an interconnection (I) having n=4 transmission conductors and a return conductor (10) distinct from the reference conductor (7). In FIG. 1, each end of the interconnection (1) is connected to a termination circuit (4) which is not connected to the reference conductor (7). Three damping circuits (8) are connected between the return conductor (10) and the reference conductor (7). The transmitting circuits (5) receive at their inputs the signals from the m=4 channels of the two sources (2), and are connected to the conductors of the interconnection (1). The receiving circuits (6) are connected to the conductors of the interconnection (1). The pseudo-differential device for transmission provides m transmission channels, such that the signals of the m channels of a source (2) connected to a transmitting circuit (5) in the activated state are sent to the m channels of the destinations (3), without noticeable echo, internal crosstalk and external crosstalk. We note that the pseudo-differential device for transmission shown in FIG. 1 provides bidirectional transmission.

Such a pseudo-differential device for transmission may comprise an interfacing device described in said French patent application Ser. No. 08/03985 and the corresponding international application. The specialist sees that, in the case where bidirectional transmission is needed, the pseudo-differential device for transmission described in said French patent application Ser. No. 08/04429 and the corresponding international application must, according to prior art, use an interfacing device described in said French patent application Ser. No. 08/03985 and the corresponding international application. For instance, the fifth embodiment of said French patent application Ser. No. 08/04429 and the corresponding international application, shown in FIG. 1, must use an interfacing device described in said French patent application Ser. No. 08/03985 and the corresponding international application. The specialist also sees that, in the same manner, this requirement applies to the pseudo-differential device for transmission described in said French patent application Ser. No. 08/04430 and the corresponding international application, in the case where bidirectional transmission is needed and where the transmission variables delivered by a transmitting circuit are linear combinations of signals each mainly determined by one and only one of the m "input signals of the transmitting circuit", one or more of the linear combinations being such that two or more of the coefficients of said one or more of the linear combinations are not equal to zero.

Unfortunately, it is not easy to build a fast and accurate balancing circuit for the interfacing device described in said French patent application Ser. No. 08/03985 and the corresponding international application. Additionally, the difficulty increases when smaller transistors are used, because of the low output impedance of MOSFETs in deep sub-micron CMOS technology. Consequently, it is often expensive to build high-performance interfacing devices for the pseudo-differential devices for transmission described in said French patent applications No. 08/04429 and 08/04430, and the corresponding international applications, in the case where bidirectional transmission is needed.

DESCRIPTION OF THE INVENTION

It is an object of the interfacing device of the invention to provide transmission through an interconnection having two or more transmission conductors, the transmission presenting reduced external crosstalk and reduced internal crosstalk.

The invention is about a device for transmitting signals through a plurality of transmission channels, in a known frequency band, comprising:

m signal terminals, a common terminal and a reference terminal (ground), the signal terminals being intended to be connected to an interconnection having at least m transmission conductors, m being an integer greater than or equal to 2;

a receiving circuit delivering, when the receiving circuit is in the activated state, p "output signals of the receiving circuit" corresponding each to a transmission channel, p being an integer greater than or equal to 1 and less than or equal to m, the input of the receiving circuit being coupled to at least p of said signal terminals and to said common terminal, each of said "output signals of the receiving circuit" being mainly determined by one or more of the voltages between one of said signal terminals and said common terminal;

a transmitting circuit receiving q "input signals of the transmitting circuit" corresponding each to a transmission channel, q being an integer greater than or equal to 2 and less than or equal to m, the output of the transmitting circuit being coupled to each of said signal terminals, the output of the transmitting circuit delivering, when the transmitting circuit is in the activated state, m transmission variables, each of said transmission variables being either a voltage between one of said signal terminals and said reference terminal or a current flowing out of one of said signal terminals, each of said transmission variables being mainly determined by one or more of said "input signals of the transmitting circuit", one or more of said transmission variables being not mainly determined by only one of said "input signals of the transmitting circuit"; and a common terminal switching circuit having an open state and a closed state, the common terminal switching circuit having a return current terminal connected to said common terminal, the common terminal switching circuit being in the closed state when the transmitting circuit is in the activated state, the common terminal switching circuit being in the open state when the receiving circuit is in the activated state, the common terminal switching circuit in the closed state providing, between said common terminal and said reference terminal, a voltage approximately equal to the sum of a constant voltage and of the voltage, determined using the active sign convention, which would appear across a first passive two-terminal circuit element through which the current flowing from said return current terminal to said common terminal would flow.

According to the invention, the common terminal is not connected to the reference terminal, in agreement with the principle of pseudo-differential transmission. In the following, the wordings "is in the deactivated state" and "is not in the activated state" are equivalent.

According to the invention, said "output signals of the receiving circuit" may be analog signals or digital signals. According to the invention, said "input signals of the transmitting circuit" may be analog signals or digital signals.

According to the invention, said receiving circuit delivers "output signals of the receiving circuit" corresponding each to a transmission channel, when the receiving circuit is in the activated state. According to the invention, there is a deactivated state of the receiving circuit, in which the common terminal switching circuit may be in the closed state.

According to the invention, the transmitting circuit in the activated state delivers transmission variables, each of said transmission variables being mainly determined by one or more of said "input signals of the transmitting circuit", one or more of said transmission variables being not mainly determined by only one of said "input signals of the transmitting circuit". According to the invention, there is a deactivated state of the transmitting circuit, in which the common terminal switching circuit may be in the open state.

Consequently, according to the invention, said receiving circuit and said transmitting circuit cannot be simultaneously in the activated state, but said receiving circuit and said transmitting circuit may be simultaneously in the deactivated state. When the receiving circuit is in the activated state, the output of the transmitting circuit in the deactivated state must be such that the voltage between the common terminal and ground may vary (this is necessary for a pseudo-differential link) and such that the voltages between the signal terminals coupled to the input of the receiving circuit and said common terminal may vary. However, there is no similar general requirement relating to the output of the receiving circuit in the deactivated state, according to the definition given above of a device of the invention.

According to the invention, each of said transmission variables is mainly determined by one or more of said "input signals of the transmitting circuit", one or more of said transmission variables being not mainly determined by only one of said "input signals of the transmitting circuit". This must be interpreted in a broad sense, as: each of said transmission variable is mainly determined, at each point in time, by the history, up to said point in time, of one or more of said "input signals of the transmitting circuit", one or more of said transmission variables being not mainly determined by the history, up to said point in time, of only one of said "input signals of the transmitting circuit".

Consequently, a linear combination of elements $x_1, \ldots, x_r$ being a sum $\lambda_1 x_1 + \ldots + \lambda_r x_r$, where $\lambda_1, \ldots, \lambda_r$ are the coefficients of the linear combination, the specialist understands that, according to the invention, each of said transmission variables delivered by said transmitting circuit may be a linear combination of signals each mainly determined by one and only one of said "input signals of the transmitting circuit", at least one of said linear combinations being such that two or more of the coefficients of said at least one of said linear combinations are not equal to zero.

The transmitting circuit used in a device of the invention may for instance only use analog signal processing to produce said transmission variables. It is also possible that the transmitting circuit used in a device of the invention uses digital signal processing to produce said transmission variables.

The specialist also understands that, according to the invention, each transmission variable delivered by said transmitting circuit may be mainly determined by a linear combination of filtered "input signals of the transmitting circuit", one or more of said transmission variables being not mainly determined by one and only one of said filtered "input signals of the transmitting circuit", each of said filtered "input signals of the transmitting circuit" being the result of the application of linear filtering to one of said "input signals of the transmitting circuit". Each of said filtered "input signals of the transmitting circuit" may be substantially equal to the corresponding input signal of the transmitting circuit. Consequently, according to the invention, each of said transmission variables delivered by said transmitting circuit may be mainly determined by a linear combination of said "input signals of the transmitting circuit", at least one of said linear combinations being such that two or more of the coefficients of said at least one of said linear combinations are not equal to zero.

For said receiving circuit, each of said "output signals of the receiving circuit" is mainly determined by one or more of the voltages between one of said signal terminals and said common terminal. This must be interpreted in a broad sense, as: each of said "output signals of the receiving circuit" is mainly determined, at each point in time, by the history, up to said point in time, of one or more of the voltages between one of said signal terminals and said common terminal. Consequently, the specialist understands that, according to the invention, each of said "output signals of the receiving circuit" may be mainly determined by a linear combination of "filtered voltages between one of said signal terminals and said common terminal", each of said "filtered voltages between one of said signal terminals and said common terminal" being the result of the application of linear filtering to one of the voltages between one of said signal terminals and said common terminal.

Each of said "filtered voltages between one of said signal terminals and said common terminal" may be substantially equal to the corresponding voltage between one of said signal terminals and said common terminal. Consequently, according to the invention, each of said "output signals of the receiving circuit" may be mainly determined by a linear combination of the voltages between one of said signal terminals and said common terminal.

According to the invention, the wording "voltage, determined using the active sign convention, which would appear across a two-terminal circuit element through which the current flowing from said return current terminal to said common terminal would flow" obviously refers to the most general "voltage, determined using the active sign convention, which may appear across a two-terminal circuit element subject to the current flowing from said return current terminal to said common terminal", that is to say a voltage which, at each point in time, is solely determined by the history, up to said point in time, of the current flowing from said return current terminal to said common terminal. The specialist understands that this wording does not imply that a two-terminal circuit element subject to the current flowing from said return current terminal to said common terminal is actually present in a device of the invention: the two-terminal circuit element is only used for modeling the voltage between said common terminal and said reference terminal (this voltage being equal to the voltage between said return current terminal and said reference terminal).

According to the invention, said common terminal switching circuit in the closed state behaves approximately, for said common terminal, as a first passive two-terminal circuit element having a first terminal held at a fixed voltage with respect to said reference terminal, and having a second terminal connected to said return current terminal. Said fixed voltage may be positive, negative or zero.

A device of the invention may be such that, in the open state, the common terminal switching circuit provides a current flowing out of said return current terminal approximately equal to zero. However, this is not at all a characteristic of the invention.

A device of the invention may be such that, in the open state, said common terminal switching circuit provides a current flowing from said return current terminal to said common terminal approximately equal to the sum of a constant current and of the current which would flow out of a second passive two-terminal circuit element subject to the voltage between said common terminal and said reference terminal, the product of the absolute value of the small-signal impedance (also referred to as dynamic impedance) of said first passive two-terminal circuit element at a first quiescent operating point, by the absolute value of the small-signal admittance (also referred to as dynamic admittance) of said second passive two-terminal circuit element at a second quiescent operating point being, in at least a part of said known frequency band, less than or equal to ½.

In this case, said common terminal switching circuit in the open state behaves approximately, for said common terminal, as a second passive two-terminal circuit element connected in parallel with a current source delivering a fixed current, this second passive two-terminal circuit element having a first terminal connected to said reference terminal, and having a second terminal connected to said return current terminal. Said fixed current may be positive, negative or zero.

The wording "current which would flow out of a two-terminal circuit element subject to the voltage between said common terminal and said reference terminal" used above obviously refers to the most general "current flowing out of a two-terminal circuit element subject to the voltage between said common terminal and said reference terminal", that is to say a current which, at each point in time, is solely determined by the history, up to this point in time, of the voltage between said common terminal and said reference terminal (this voltage being equal to the voltage between said return current terminal and said reference terminal). The specialist understands that this wording does not imply that a two-terminal circuit element subject to the voltage between said common terminal and said reference terminal is actually present in a device of the invention: the two-terminal circuit element is only used for modeling the current flowing out of said common terminal.

According to the invention, said first two-terminal circuit element used for modeling the common terminal switching circuit in the closed state and said second two-terminal circuit element used for modeling the common terminal switching circuit in the open state are passive two-terminal circuit elements in the meaning of circuit theory (a passive circuit element is a circuit element in which the energy absorbed can only be positive or zero), but these passive two-terminal circuit elements are not necessarily linear.

According to the invention, said common terminal switching circuit in the closed state may be such that, at said first quiescent operating point, said first passive two-terminal circuit element has a small-signal impedance having, in said known frequency band, an absolute value less than or equal to three hundred ohms. The set of the dynamic impedances defined by this inequality is such that, when said transmitting circuit is in the activated state, the currents injected in the transmission conductors may be associated with return currents flowing mainly in the common conductor of said interconnection, which must be connected to said common terminal. The specialist understands that this situation allows reduced unwanted couplings with other electronic circuits near the interconnection.

The above inequality concerning the product of the absolute value of the small-signal impedance of said first passive two-terminal circuit element by the absolute value of the small-signal admittance of said second passive two-terminal circuit element should be applicable to the normal operation of the device of the invention. Consequently:

said first quiescent operating point chosen for determining the small-signal impedance of said first passive two-terminal circuit element should correspond to a quiescent current, flowing out of said return current terminal, which may appear at a given point in time under normal operation, when the common terminal switching circuit is in the closed state;

said second quiescent operating point chosen for determining the small-signal admittance of said second passive two-terminal circuit element should correspond to a quiescent voltage, between said common terminal and said reference terminal, which may appear at a given point in time under normal operation, when the common terminal switching circuit is in the open state.

A device of the invention may also be such that, in the open state, said common terminal switching circuit provides a current flowing out of said return current terminal approximating the sum of a constant current and of the current which would flow out of a second passive two-terminal circuit element subject to the voltage between said common terminal and said reference terminal, the product of the absolute value of the small-signal impedance of said first passive two-terminal circuit element at any quiescent operating point taken in a specified interval of currents flowing out of said return current terminal, by the absolute value of the small-signal admittance of said second passive two-terminal circuit element at any quiescent operating point taken in a specified interval of voltages between said common terminal and said reference terminal being, in at least a part of said known frequency band, less than or equal to ½.

Let us use $v_{C0\ ON}$ to denote said constant voltage and let us use $i_{C0\ OFF}$ to denote said constant current. According to the invention, $v_{C0\ ON}$ may be positive, zero or negative and $i_{C0\ OFF}$ may be positive, zero or negative. Let us use $[i_{C1}, i_{C2}]$ to denote said specified interval of currents flowing out of said return current terminal and let us use $[v_{C1}, v_{C2}]$ to denote said specified interval of voltages between said common terminal and said reference terminal, in the case where these intervals are closed. According to the invention, we may say that, for any frequency f in said part of said known frequency band:
1) for any quiescent operating point $i_{C\ BIAS} \in [i_{C1}, i_{C2}]$ of the common terminal switching circuit in the closed state, we may define a small-signal impedance of said first passive two-terminal circuit element, this small-signal impedance $Z_{ON}(i_{C\ BIAS}, f)$ being in general a complex number;
2) for any quiescent operating point $v_{C\ BIAS} \in [v_{C1}, v_{C2}]$ of the common terminal switching circuit in the open state, we may define a small-signal admittance of said second passive two-terminal circuit element, this small-signal admittance $Y_{OFF}(v_{C\ BIAS}, f)$ being in general a complex number;
3) we may have $$|Z_{ON}(i_{C\ BIAS}, f)||Y_{OFF}(v_{C\ BIAS}, f)| \le \frac{1}{2} \quad (1)$$

In other words, we have either $$|Y_{OFF}(v_{C\ BIAS}, f)| = 0 \quad (2)$$

$$|Z_{ON}(i_{C\ BIAS}, f)| \le \frac{1}{2|Y_{OFF}(v_{C\ BIAS}, f)|} \quad (3)$$

In a way, we may say that, for the common terminal, in said part of said known frequency band, the absolute value of the dynamic impedance of the common terminal switching circuit in the closed state is less than or equal to the half of the absolute value of the dynamic impedance of the common terminal switching circuit in the open state.

According to the invention, when the common terminal switching circuit is in the closed state, the relationship between the current flowing out of said return current terminal and the voltage between said common terminal and said reference terminal may be non-linear. Conversely, according to the invention, when the common terminal switching circuit is in the closed state, the relationship between the current flowing out of said return current terminal and the voltage between said common terminal and said reference terminal may be linear. In this case, we may, at a given frequency f, write $$\text{if } f=0 \ v_C - v_{C0\ ON} = -i_C Z_{ON} \quad (4)$$

$$\text{if } f \ne 0 \ \underline{v_C} = -\underline{i_C} Z_{ON} \quad (5)$$

where $Z_{ON}$ is the internal impedance of the common terminal switching circuit in the closed state, where the voltage $\underline{v_C}$ is the phasor corresponding to the real voltage $v_C$ which is the voltage between said common terminal and said reference terminal, and where the current $\underline{i_C}$ is the phasor corresponding to the real current $i_C$ which is the current flowing out of said return current terminal.

According to the invention, when said common terminal switching circuit is in the open state, the relationship between the current flowing out of said return current terminal and the voltage between said common terminal and said reference terminal may be non-linear. Conversely, according to the invention, when said common terminal switching circuit is in the open state, the relationship between the current flowing out of said return current terminal and the voltage between said common terminal and said reference terminal may be linear. In this case, we may, at a given frequency f, write $$\text{if } f=0 \ i_C - i_{C0\ OFF} = -v_C Y_{OFF} \quad (6)$$

$$\text{if } f \ne 0 \ \underline{i_C} = -\underline{v_C} Y_{OFF} \quad (7)$$

where $Y_{OFF}$ is the internal admittance of the common terminal switching circuit in the open state.

We note that the equations (4) to (7) are not restricted to small signals and that they do not refer to a quiescent operating point.

In the case where the equation (1) and the equations (4) to (7) are applicable, for any frequency f in said part of said known frequency band, we note that the equation (1) may be replaced by:

$$|Z_{ON}||Y_{OFF}| \le \frac{1}{2} \quad (8)$$

In this case, we may say that, in a way, for the common terminal: the common terminal switching circuit in the closed state is equivalent to a network
comprising a voltage source delivering a constant voltage connected in series with a
first passive linear two-terminal circuit element presenting a "low" impedance; the common terminal switching circuit in the open state is equivalent to a network comprising
a current source delivering a constant current connected in parallel with a second passive linear two-terminal circuit element presenting a "high" impedance.

The specialists understand how they can build a common terminal switching circuit used in the interfacing device of the invention.

A device of the invention may be such that said common terminal switching circuit, said transmitting circuit and said receiving circuit are without any part in common to any two of them. Consequently, a device of the invention may be such that said common terminal switching circuit has no part in common with said transmitting circuit. Conversely, an interfacing device of the invention may be such that said common terminal switching circuit, said transmitting circuit and said receiving circuit are not without any part in common to any two of them. In particular, a device of the invention may be such that said common terminal switching circuit has at least one part in common with said transmitting circuit.

Even in the case of a device of the invention in which said common terminal switching circuit, said transmitting circuit and said receiving circuit are not without any part in common to any two of them, the specialist understands that the functions of the common terminal switching circuit, of the transmitting circuit and of the receiving circuit are distinct. The definition of a device of the invention, this definition being based on the presence of a common terminal switching circuit, of a transmitting circuit and of a receiving circuit, must therefore be understood as a definition relating to functions.

Said interconnection having m transmission conductors may be realized using a cable. Said interconnection may also be realized without using a cable, for instance an interconnection formed in or on a rigid or flexible printed circuit board (using traces and/or copper areas), or an interconnection formed in or on the substrate of a multi-chip module (MCM) or of an hybrid circuit, or an interconnection formed inside a monolithic integrated circuit.

A device of the invention may be such that it constitutes a part of an integrated circuit, said interconnection being realized inside said integrated circuit. In this case, it is possible that said m signal terminals and/or said common terminal are not coupled to pins of said integrated circuit.

A device of the invention may be such that it constitutes a part of an integrated circuit, each of said m signal terminals being coupled to one or more pins of said integrated circuit, said common terminal being coupled to one or more pins of said integrated circuit. This configuration is appropriate when said interconnection is realized outside said integrated circuit. The specialist notes that if there are many signal terminals, for instance more than 16 signal terminals, the absolute value of the current which may flow through the common terminal may become much larger than the maximum absolute value of the current flowing through a single signal terminal. Consequently, in this case, if a single pin is allocated to the common terminal, a degradation of transmission may occur for fast signals, because of the inductance of a connection using a single pin. In this case, using several pins for the common terminal reduces this inductance and improves transmission.

A device of the invention may further comprise a termination circuit coupled to each of said signal terminals and to said common terminal, the termination circuit being, when the termination circuit is in the activated state, approximately equivalent, for said signal terminals and said common terminal, to a (m+1)-terminal network such that, at at least one quiescent operating point, for small signals in said part of said known frequency band, the impedance matrix, with respect to said common terminal, of said (m+1)-terminal network is equal to a wanted diagonal matrix of size m×m. Consequently, if each of said "output signals of the receiving circuit" is mainly determined by one and only one of the voltages between one of said signal terminals and said common terminal, a device of the invention may comprise a "Pseudo-differential interfacing device having a termination circuit" described in the French patent application Ser. No. 07/04421 of 21 Jun. 2007, entitled "Dispositif d'interface pseudo-différentiel avec circuit de terminaison", corresponding to the international application number PCT/IB2008/051826 of 8 May 2008 (WO 2008/155676), entitled "Pseudo-differential interfacing device having a termination circuit".

A device of the invention may further comprise a termination circuit coupled to each of said signal terminals and to said common terminal, the termination circuit being, when the termination circuit is in the activated state, approximately equivalent, for said signal terminals and said common terminal, to a (m+1)-terminal network such that, at at least one quiescent operating point, for small signals in said part of said known frequency band, the impedance matrix, with respect to said common terminal, of said (m+1)-terminal network is equal to a wanted non-diagonal matrix of size m×m. Consequently, a device of the invention may comprise a "Multichannel interfacing device having a termination circuit" disclosed in the French patent application Ser. No. 08/03876 of 8 Jul. 2008, entitled "Dispositif d'interface multicanal avec circuit de terminaison", corresponding to the international application number PCT/IB2009/051182 of 20 Mar. 2009, entitled "Multichannel interfacing device having a termination circuit".

According to the invention, it is possible that there is a deactivated state of the termination circuit, in which the behavior of the termination circuit is different from the one defined above. However, the existence of a deactivated state of the termination circuit is not at all a characteristic of the invention.

An interfacing device of the invention may be such that said termination circuit is made of a network of resistors.

A termination circuit made of a network of resistors is however not at all a characteristic of the invention. By way of a first example, designers may, in order to reduce the power consumed by the termination circuit, choose to allow the termination circuit to be effective only in a relevant interval of frequencies, for instance by including suitable reactive circuit elements in the termination circuit. By way of a second example, the termination circuit could include active components, for instance insulated gate field-effect transistors (MOSFETs) operating in the ohmic regime. The impedance of the channel of such components may be adjustable by electrical means. Consequently, said termination circuit may be such that the impedance matrix, with respect to said common terminal, of said termination circuit in the activated state can be adjusted by electrical means.

In the same way, a device of the invention may be such that said small-signal impedance of said first passive two-terminal circuit element and/or said small-signal admittance of said second passive two-terminal circuit element can be adjusted by electrical means.

In the case where the termination circuit has an activated state and a deactivated state, the impedance of the channel of one or more MOSFETs may for instance be controlled by one or more control signals taking on different values in the activated state and in the deactivated state. Consequently, said termination circuit may be such that said termination circuit has an activated state and a deactivated state, the impedance matrix, with respect to said common terminal, of said termination circuit in the activated state being different from the impedance matrix, with respect to said common terminal, of said termination circuit in the deactivated state.

In the case where the termination circuit has an activated state and a deactivated state, components such as transistors may for instance be used as switches having a closed state and an open state. In this case, said transistors may for instance be in the closed state when the termination circuit is in the activated state, and be in the open state when the termination circuit is in the deactivated state. Consequently, said termination circuit may be such that said termination circuit has an activated state and a deactivated state, each current flowing from said termination circuit to one of said signal terminals being substantially zero when said termination circuit is in the deactivated state. Designers may, in order to reduce the power consumed by the termination circuit, choose to put such a termination circuit in the deactivated state when said transmitting circuit is in the activated state.

An interfacing device of the invention may be such that said termination circuit has no part in common with said common terminal switching circuit and/or with said transmitting circuit and/or with said receiving circuit. Conversely, an interfacing device of the invention may be such that said termination circuit has one or more parts in common with said common terminal switching circuit and/or with said transmitting circuit and/or with said receiving circuit.

According to the invention, the number m of signal terminals may be equal to the number q of "input signals of the transmitting circuit". According to the invention, the number m of signal terminals may be equal to the number p of "output signals of the receiving circuit". In particular, an interfacing device of the invention may be such that m is greater than or equal to three.

According to the invention, the q "input signals of the transmitting circuit" may for instance be applied to the transmitting circuit using single-ended links. According to the invention, the q "input signals of the transmitting circuit" may for instance be applied to the transmitting circuit using differential links. According to the invention, the p "output signals of the receiving circuit" may for instance be delivered using single-ended links. According to the invention, the p "output signals of the receiving circuit" may for instance be delivered using differential links.

According to the invention, the transmitting circuit and/or the receiving circuit may have a filtering function, for instance for the purpose of obtaining a pre-emphasis, a de-emphasis or an equalization improving transmission. It then becomes necessary to synthesize the corresponding filters, either as analog filters or as digital filters, using one of the many methods known to specialists.

When losses are not negligible in the interconnection, phase and amplitude distortions may occur, which are referred to as distortions caused by propagation. The reduction of these distortions may be obtained, in a device of the invention, using an equalization reducing the effects of the distortions caused by propagation, said equalization being implemented in said transmitting circuit and/or in said receiving circuit. This type of processing, which is also sometimes referred to as compensation, is well known to specialists, and may be implemented using analog signal processing or digital signal processing. Specialists know that it is commonplace to use adaptive algorithms for implementing this type of processing in receivers for data transmission. A device of the invention may use an adaptive equalization. This type of processing is well known to specialists, and is often implemented using digital signal processing.

BRIEF DESCRIPTION OF THE DRAWINGS

Other advantages and characteristics of the invention will appear more clearly from the following description of particular embodiments of the invention, given by way of non-limiting examples, with reference to the accompanying drawings in which.

DETAILED DESCRIPTION OF SOME EMBODIMENTS

First Embodiment

Figure 1:
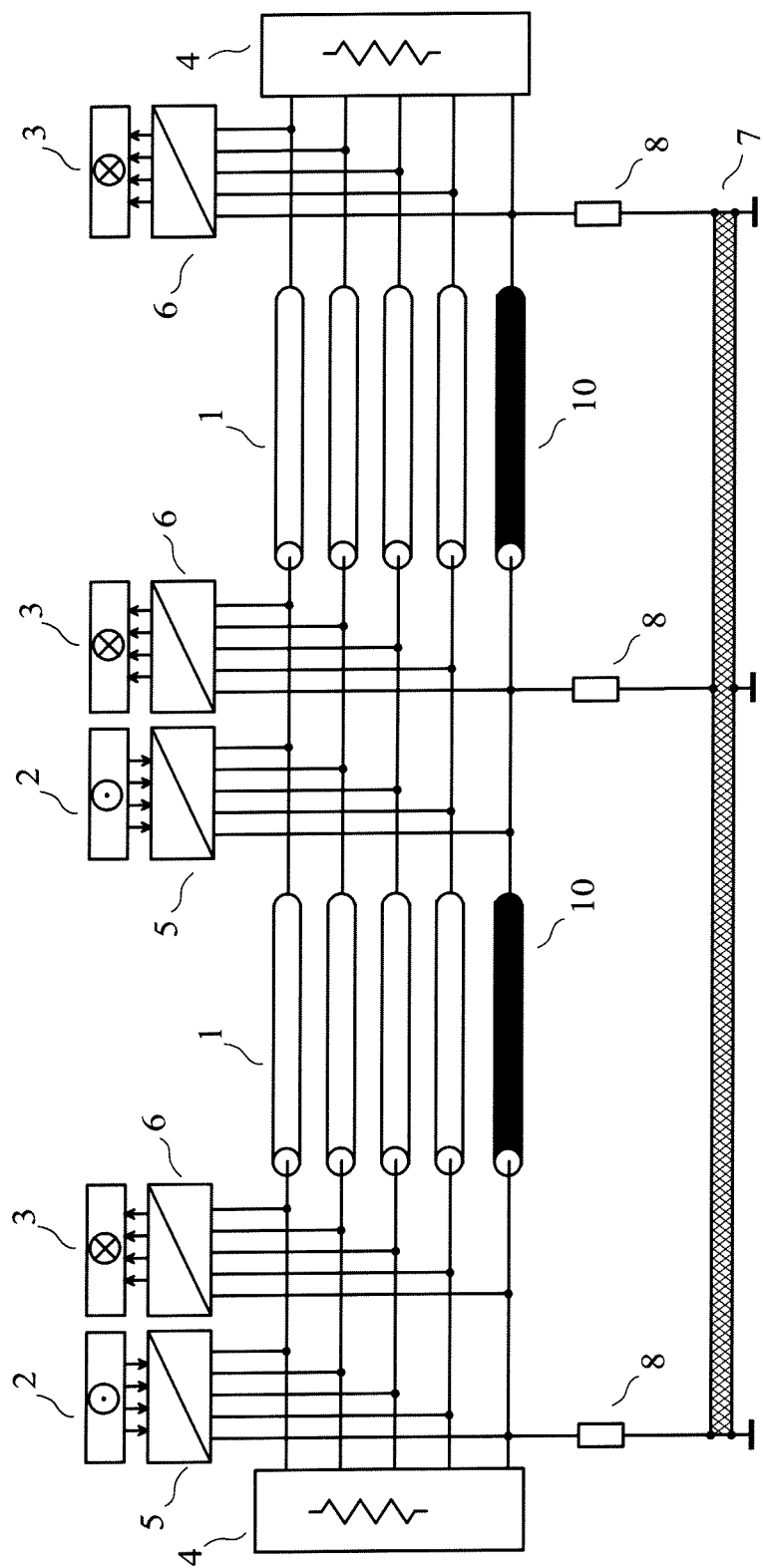
FIG. 1 shows a pseudo-differential system for transmission comprising an interconnection having four transmission conductors, and has already been discussed in the section dedicated to the presentation of prior art.
Figure 2:
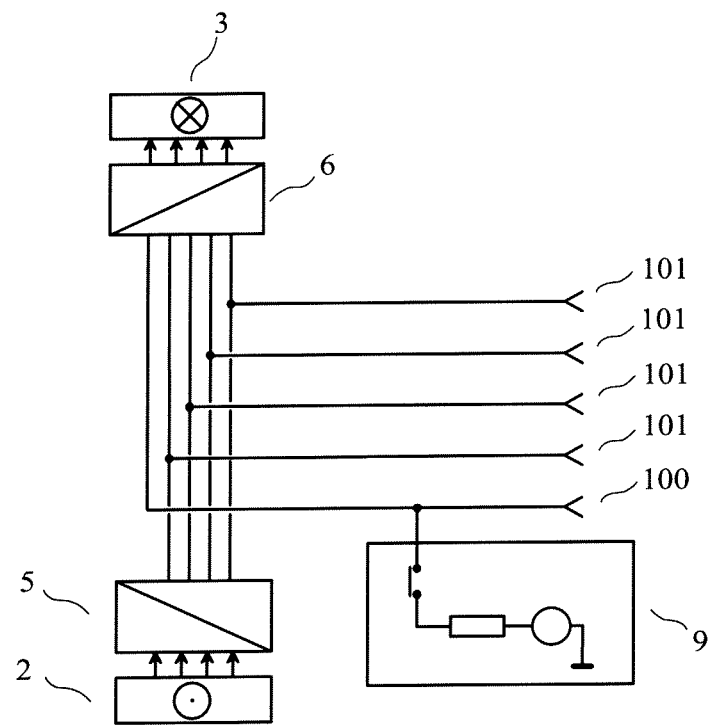
FIG. 2 shows the block-diagram of a first embodiment of the invention.

As a first embodiment of an interfacing device of the invention, given by way of non-limiting example, we have represented in FIG. 2 an interfacing device of the invention built inside an integrated circuit, comprising m=4 signal terminals (101) and a common terminal (100), the signal terminals (101) and the common terminal (100) being intended to be connected to an interconnection having m transmission conductors.

A transmitting circuit (5) receives q=4 "input signals of the transmitting circuit" coming from a source (2), the output of the transmitting circuit being coupled to the m signal terminals (101). The output of the transmitting circuit (5) is not coupled to the common terminal (100). The output of the transmitting circuit (5) delivers, when the transmitting circuit is in the activated state, m transmission variables, each transmission variable being a voltage between one of said signal terminals (101) and the reference terminal (ground), each transmission variable being a linear combination of signals each mainly determined by one and only one of said q "input signals of the transmitting circuit", at least one of said linear combinations being such that two or more of the coefficients of said at least one of said linear combinations are not equal to zero. When the transmitting circuit (5) is in the activated state, its output presents a low impedance between said signal terminals (101) and said reference terminal. When the transmitting circuit (5) is not in the activated state, its output presents a high impedance, so that the transmitting circuit (5) does not produce transmission variables and only causes a negligible current through the signal terminals (101).

A receiving circuit (6) delivers, when the receiving circuit is in the activated state, p=4 "output signals of the receiving circuit" corresponding each to a transmission channel, the input of the receiving circuit being coupled to the m signal terminals (101) and to the common terminal (100), each of said "output signals of the receiving circuit" being mainly determined by a linear combination of the voltages between one of said signal terminals (101) and said common terminal (100). The input of the receiving circuit (6) always presents a high impedance between said signal terminals (101) and said reference terminal. The "output signals of the receiving circuit" are delivered to the destination (3) when the receiving circuit (6) is in the activated state. When the receiving circuit (6) is not in the activated state, its output presents a high impedance, so that the receiving circuit (6) does not deliver any "output signal of the receiving circuit".

The specialist knows several suitable methods for producing a high impedance state at the output of the transmitting circuit (5) and at the output of the receiving circuit (6). The specialist understands how he may design, with prior art techniques, a transmitting circuit (5) performing said linear combinations of signals each mainly determined by one and only one of said "input signals of the transmitting circuit", at least one of said linear combinations being such that two or more of the coefficients of said at least one of said linear combinations are not equal to zero, using analog signal processing and/or digital signal processing to perform said linear combinations. For instance, such transmitting circuits are used in said French patent number 0300064, said French patent number 0302814 and the corresponding international applications. The specialist understands how he may design, with prior art techniques, a receiving circuit (6) such that each of said "output signals of the receiving circuit" is mainly determined by a linear combination of the voltages between one of said signal terminals (101) and said common terminal (100), using analog signal processing and/or digital signal processing to perform said linear combinations. For instance, such receiving circuits are disclosed in the French patent application Ser. No. 08/03830 of 7 Jul. 2008, entitled "Circuit de reception pseudo-différentiel" corresponding to the international application number PCT/IB2009/051053 of 13 Mar. 2009, entitled "Pseudo-differential receiving circuit".

In the device of the invention shown in FIG. 2, the receiving circuit (6) and the transmitting circuit (5) cannot be simultaneously in the activated state. The possibility of controlling the activated state of a transmitting circuit and/or of a receiving circuit is usually used in data bus architectures. We note that the circuits needed to control the activated state of the transmitting circuit (5) and of the receiving circuit (6) at a given point in time are not shown in FIG. 2. We also note that the address and/or control lines necessary for coordinating the activated state of the transmitting circuit (5) and of the receiving circuit (6) with the operation of the other entities connected to such a bus are not shown in FIG. 2. These address and/or control lines could be conductors of said interconnection.

A common terminal switching circuit (9) has a return current terminal connected to said common terminal (100). The common terminal switching circuit (9) has an open state and a closed state. The common terminal switching circuit (9) is in the closed state when the transmitting circuit (5) is in the activated state, and is in the open state when the receiving circuit (6) is in the activated state. When the transmitting circuit (5) is in the deactivated state and the receiving circuit (6) is in the deactivated state, the common terminal switching circuit (9) is for instance in the open state.

In the closed state, the common terminal switching circuit (9) provides a voltage $v_C$ between said common terminal (100) and said reference terminal (ground), this voltage $v_C$ approximating the sum of a constant voltage $v_{C0\ ON}$ and of the voltage, determined using the active sign convention, which would appear across a first passive two-terminal circuit element subject to the current flowing from said return current terminal to said common terminal. In other words, in the closed state, the common terminal switching circuit (9) is, for the common terminal (100), equivalent to a network comprising a voltage source delivering a constant voltage $v_{C0\ ON}$, this voltage source having a first terminal connected to ground, this voltage source having a second terminal connected to the first terminal of the first passive two-terminal circuit element, the second terminal of the first passive two-terminal circuit element being connected to said common terminal (100).

In the open state, the common terminal switching circuit (9) provides a current flowing out of said return current terminal approximating the sum of a constant current $i_{C0\ OFF}$ and of the current which would flow out of a second passive two-terminal circuit element subject to the voltage between said common terminal (100) and said reference terminal. In other words, in the open state, the common terminal switching circuit (9) is, for the common terminal (100), equivalent to a network comprising a current source delivering a constant current $i_{C0\ OFF}$, this current source having a first terminal connected to ground, this current source having a second terminal connected to said common terminal (100), this current source being connected in parallel with the second passive two-terminal circuit element.

At any frequency f such that f<1 GHz, the equation (1) is applicable, that is to say: the product of $|Z_{ON}(i_{C\ BIAS}, f)|$ by $|Y_{OFF}(v_{C\ BIAS}, f)|$ is less than or equal to ½.

Figure 3:
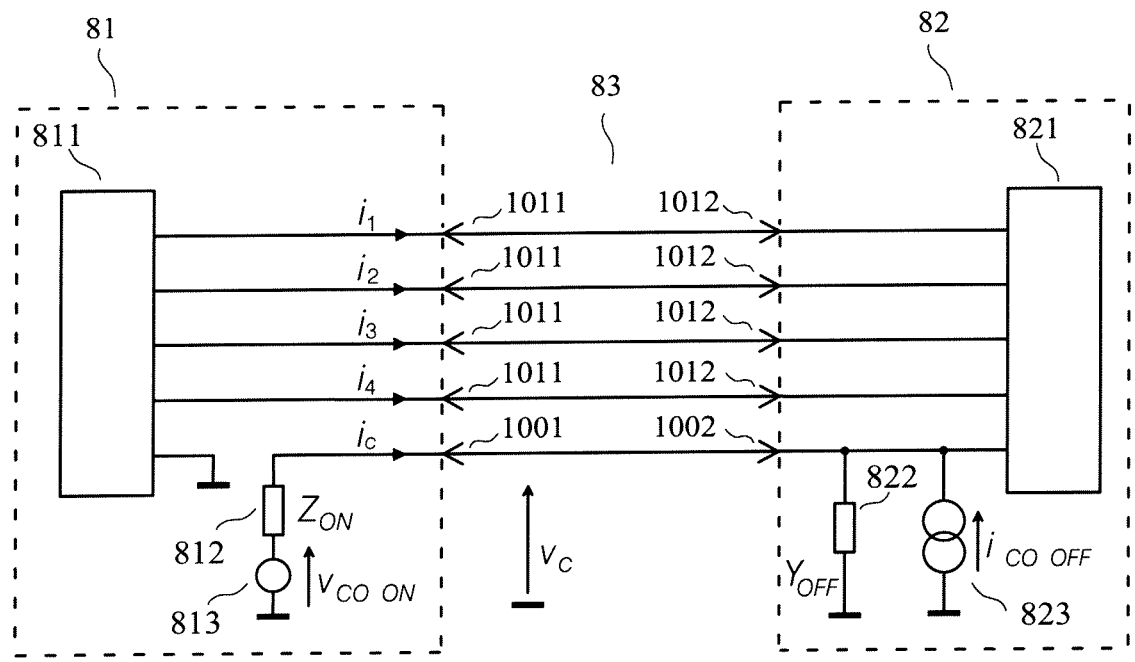
FIG. 3 shows a use of a device of the invention.

Let us consider a use of a device of the invention A, this use also involving a device of the invention B identical to the device of the invention A for receiving the transmission variables sent by the device of the invention A through said interconnection. We therefore consider the case in which the transmitting circuit of the device of the invention A is in the activated state and the receiving circuit of the device of the invention B is in the activated state. The FIG. 3 shows an equivalent network (81) for the circuit element having m+2 terminals seen by the left end of the interconnection (83) when the transmitting circuit of the device of the invention A is in the activated state. This equivalent network (81) for the device of the invention A having its transmitting circuit in the activated state comprises a first isolated circuit (811) having exactly m+1 terminals, a voltage source (813) delivering the constant voltage $v_{C0\ ON}$ and a first passive two-terminal circuit element (812) presenting a dynamic impedance $Z_{ON}(i_{C\ BIAS}, f)$. The first isolated circuit (811) having exactly m+1 terminals has m terminals connected to the signal terminals (1011) of the device of the invention A, has one terminal connected to ground and presents a low impedance between each of the signal terminals (1011) of the device of the invention A and ground. The common terminal (1001) of the device of the invention A is connected to the first passive two-terminal circuit element (812) connected in series with the voltage source (813).

The FIG. 3 also shows an equivalent network (82) for the circuit element having m+2 terminals seen by the right end of the interconnection (83) when the receiving circuit of the device of the invention B is in the activated state. This equivalent network (82) for the device of the invention B having its receiving circuit in the activated state comprises a second isolated circuit (821) having exactly m+1 terminals, a current source (823) delivering the constant current $i_{C0\ OFF}$ and a second passive two-terminal circuit element (822) presenting a dynamic admittance $Y_{OFF}(v_{C\ BIAS}, f)$. The second isolated circuit (821) having exactly m+1 terminals has m terminals connected to the signal terminals (1012) of the device of the invention B and has one terminal connected to the common terminal (1002) of the device of the invention B. The common terminal (1002) of the device of the invention B is also connected to the second passive two-terminal circuit element (822) connected in parallel with the current source (823).

According to a first example, in a given frequency band, $|(Z_{ON}(i_{C\ BIAS}, f)|<10\Omega$ and $|Y_{OFF}(v_{C\ BIAS}, f)|<100\ \mu S$. Consequently, $|Z_{ON}(i_{C\ BIAS}, f)||Y_{OFF}(v_{C\ BIAS}, f)|<1/1000$. In this first example, the common terminal (1001) of the device of the invention A presents a "low" impedance with respect to ground and the common terminal (1002) of the device of the invention B presents a "high" impedance with respect to ground.

According to a second example, in a given frequency band, $Z_{ON}(i_{C\ BIAS}, f) \approx 78\Omega$ and $|Y_{OFF}(v_{C\ BIAS}, f)|<120\ \mu S$. Consequently, $|Z_{ON}(i_{C\ BIAS}, f)||Y_{OFF}(v_{C\ BIAS}, f)|<1/100$. In this second example, the common terminal (1002) of the device of the invention B presents a "high" impedance with respect to ground and the first passive two-terminal circuit element (812) effectively damps the resonances of the common conductor of the interconnection (83), which links the common terminals (1001) (1002). Here, $Z_{ON}(i_{C\ BIAS}, f)$ is such that the receiving circuit of the device of the invention B must effectively reject the influence of the voltage between its common terminal (1002) and ground on the "output signals of the receiving circuit".

According to a third example, in a given frequency band, $|Z_{ON}(i_{C\,BIAS}, f)|<5\Omega$ and $Y_{OFF}(v_{C\,BIAS}, f) \approx 6$ mS. Consequently, $|Z_{ON}(i_{C\,BIAS}, f)||(Y_{OFF}(v_{C\,BIAS}, f)|<3/100$. In this third example, the common terminal (1001) of the device of the invention A presents a "low" impedance with respect to ground and the second passive two-terminal circuit element (822) effectively damps the resonances of the common conductor of the interconnection (83).

The specialists may compare the advantages of these three examples of proportioning of the first passive two-terminal circuit element (812) and of the second passive two-terminal circuit element (822), as a function of the length and of the characteristics of the interconnection (83), and as a function of the considered frequency band.

The specialist understands that, for an accurate modeling of a given use, it would be necessary to describe propagation and couplings in the interconnection (83), for instance using the theory of multiconductor transmission lines to take into account the distributed capacitances and the distributed inductances. The equivalent networks (81) (82) of FIG. 3 for the devices of the invention are also simplified. The equivalent schematic diagram of FIG. 3 is therefore only an approximation.

The specialist understands how he may, using prior art techniques, design a common terminal switching circuit (9) providing an open state when the receiving circuit (6) is in the activated state and a closed state when the transmitting circuit (5) is in the activated state. For instance, such common terminal switching circuits are used in the French patent application Ser. No. 07/04949 of 9 Jul. 2007, entitled "Dispositif d'interface pseudo-différentiel avec circuit de commutation", corresponding to the international application PCT/IB2008/051982 of 20 May 2008 (WO 2009/007866) entitled "Pseudo-differential interfacing device having a switching circuit".

Second Embodiment

Figure 4:
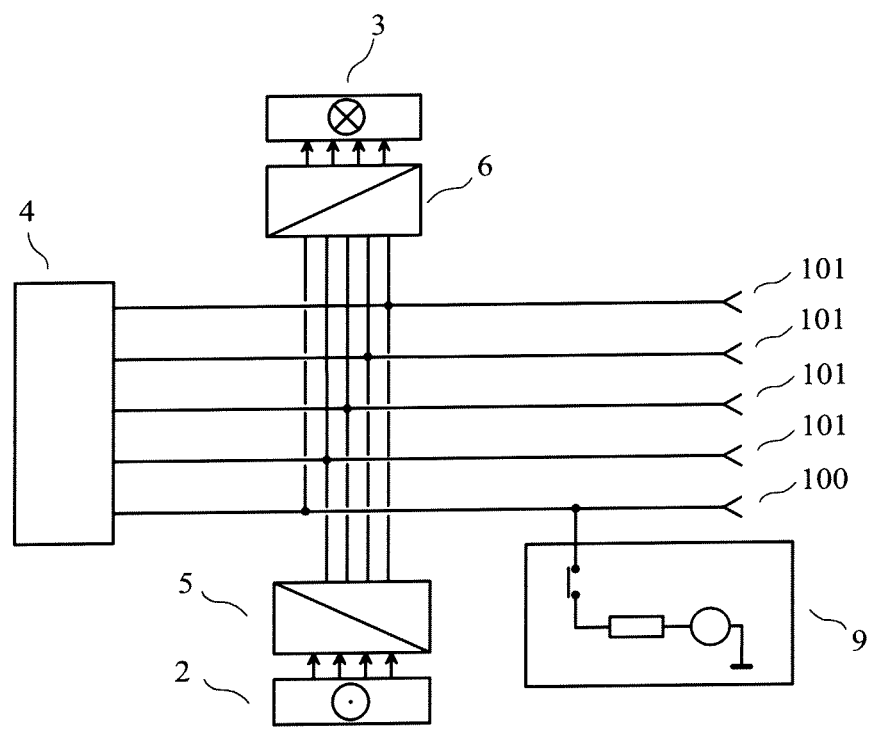
FIG. 4 shows the block-diagram of a second embodiment, a third embodiment and a fourth embodiment.

As a second embodiment of an interfacing device of the invention, given by way of non-limiting example, we have represented in FIG. 4 an interfacing device of the invention built inside an integrated circuit, comprising m=4 signal terminals (101) and a common terminal (100), the signal terminals (101) and the common terminal (100) being intended to be connected to an interconnection having m transmission conductors.

A transmitting circuit (5) receives q=4 "input signals of the transmitting circuit" coming from a source (2), the output of the transmitting circuit being coupled to the m signal terminals (101). The output of the transmitting circuit (5) is not coupled to the common terminal (100). The output of the transmitting circuit (5) delivers, when the transmitting circuit is in the activated state, m transmission variables, each transmission variable being a voltage between one of said signal terminals (101) and the reference terminal (ground), each transmission variable being mainly determined by a linear combination of said q "input signals of the transmitting circuit", at least one of said linear combinations being such that two or more of the coefficients of said at least one of said linear combinations are not equal to zero.

A receiving circuit (6) delivers, when the receiving circuit is in the activated state, p=4 "output signals of the receiving circuit" corresponding each to a transmission channel, the input of the receiving circuit being coupled to the m signal terminals (101) and to the common terminal (100). When the receiving circuit (6) is in the activated state, the "output signals of the receiving circuit" are delivered to the destination (3).

A common terminal switching circuit (9) has a return current terminal connected to said common terminal (100).

This second embodiment of an interfacing device of the invention comprises a termination circuit (4), the termination circuit being connected to the m signal terminals (101) and to the common terminal (100), the termination circuit being, when the termination circuit is in the activated state, approximately equivalent, for said signal terminals and said common terminal, to a linear (m+1)-terminal network such that, in the known frequency band used for transmission, the impedance matrix, with respect to said common terminal, of said linear (m+1)-terminal network is equal to a wanted diagonal matrix of size m×m. This wanted diagonal matrix of size m×m may be frequency-dependent.

In this second embodiment, each of said "output signals of the receiving circuit" is mainly determined by one and only one of the voltages between one of said signal terminals (101) and said common terminal (100). Consequently, the termination circuit (4) and the receiving circuit (6) form a "Pseudo-differential interfacing device having a termination circuit" disclosed in said French patent application Ser. No. 07/04421 and the corresponding international application.

Figure 5:
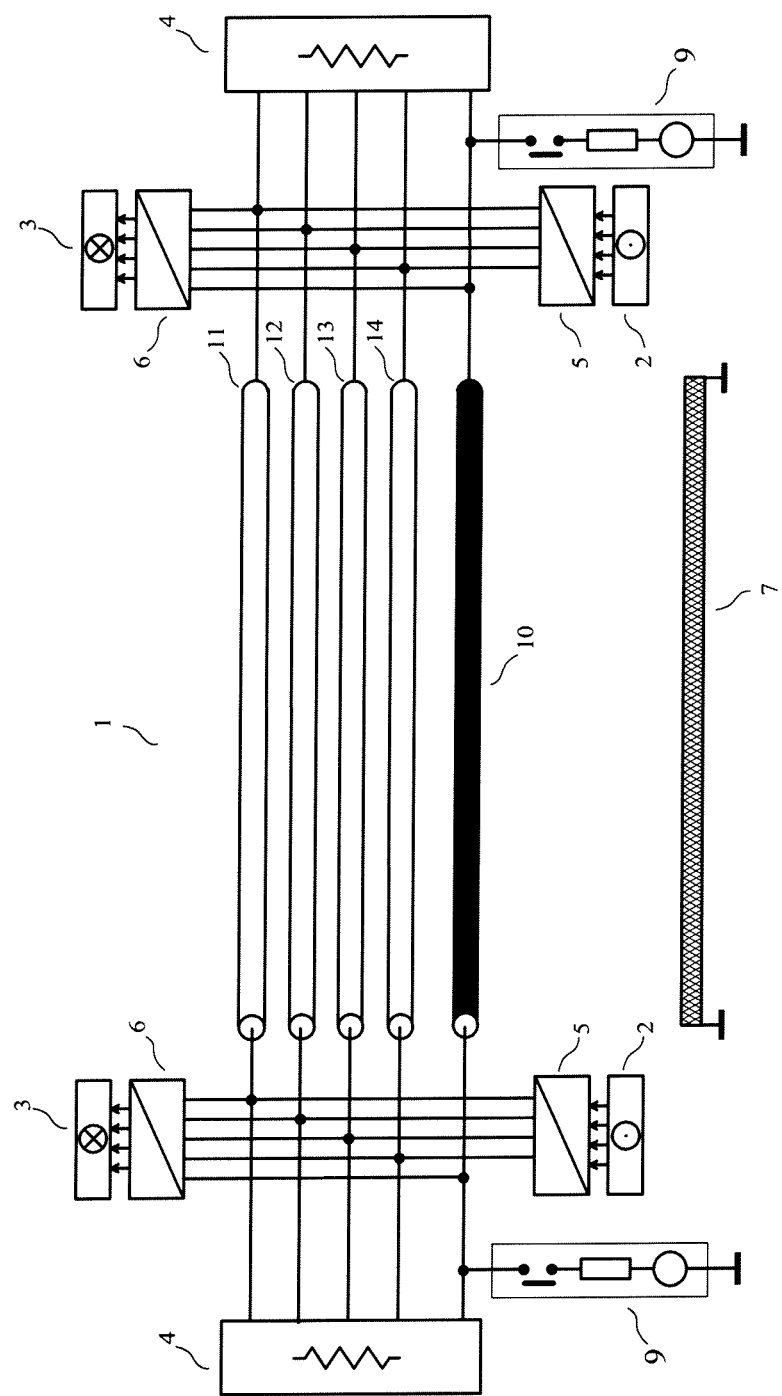
FIG. 5 shows a use of a device of the invention.

FIG. 5 shows a use of interfacing devices of the invention, this use comprising an interconnection (1) having m=4 transmission conductors (11) (12) (13) (14) and a return conductor (10), the interconnection being structurally combined with a reference conductor (7), that is to say a ground conductor. All items shown in FIG. 5 belong to the same printed circuit assembly and the reference conductor (7) is a ground plane of the printed circuit board of this printed circuit assembly. Said transmission conductors (11) (12) (13) (14) and the return conductor (10) are traces built in the printed circuit board. At each end of the interconnection (1), we find an interfacing device of the second embodiment of the invention, comprising a transmitting circuit (5), a common terminal switching circuit (9), a receiving circuit (6) and a termination circuit (4). The FIG. 5 also shows a source (2) and a destination (3) at each end of the interconnection (1).

When the transmitting circuit (5) of the interfacing device of the invention shown on the left in FIG. 5 is in the activated state, the receiving circuit (6) of the interfacing device of the invention shown on the right in FIG. 5 must be in the activated state. In this case, the current flowing in the reference conductor (7) because of the signals sent through the interconnection (1) is low since only one common terminal switching circuit (9) is in the closed state (the common terminal switching circuit shown on the left in FIG. 5). When the transmitting circuit (5) of the interfacing device of the invention shown on the right in FIG. 5 is in the activated state, the receiving circuit (6) of the interfacing device of the invention shown on the left in FIG. 5 must be in the activated state. In this case, the current flowing in the reference conductor (7) because of the signals sent through the interconnection (1) is low since only one common terminal switching circuit (9) is in the closed state (the common terminal switching circuit shown on the right in FIG. 5). Consequently, the specialist in electromagnetic compatibility understands that the object of reduced external crosstalk is achieved.

The interconnection (1) and the two interfacing devices of the second embodiment of the invention shown in FIG. 5 are proportioned such that they form a device for pseudo-differential transmission disclosed in said French patent application Ser. No. 07/05260 and the corresponding international application. Consequently, a reduced echo is obtained. However, the impedance of the return conductor (10) and the impedance of a common terminal switching circuit (9) in the closed state produce some internal crosstalk (this phenomenon is similar to the one explained in the first embodiment of said French patent application Ser. No. 08/03830 and the corresponding international application). The specialist understands that the linear combinations of signals each mainly determined by one and only one of said q "input signals of the transmitting circuit", performed in one of the transmitting circuits (5) when this transmitting circuit is in the activated state, can be used to reduce this cause of internal crosstalk.

Third Embodiment

Best Mode

A third embodiment of an interfacing device of the invention, given by way of non-limiting example and best mode of carrying out the invention, also corresponds to the interfacing device of the invention shown in FIG. 4, comprising m=4 signal terminals (101) and a common terminal (100), the signal terminals (101) and the common terminal (100) being intended to be connected to an interconnection having m transmission conductors.

A transmitting circuit (5) receives q=4 "input signals of the transmitting circuit" coming from a source (2), the output of the transmitting circuit being coupled to the m signal terminals (101). The output of the transmitting circuit (5) is not coupled to the common terminal (100). The output of the transmitting circuit (5) delivers, when the transmitting circuit is in the activated state, m transmission variables, each transmission variable being a current flowing out of one of said signal terminals (101), each transmission variable being a linear combination of signals each mainly determined by one and only one of said q "input signals of the transmitting circuit", at least one of said linear combinations being such that two or more of the coefficients of said at least one of said linear combinations are not equal to zero. When the transmitting circuit (5) is in the activated state, its output presents a high impedance between said signal terminals (101) and said reference terminal. When the transmitting circuit (5) is not in the activated state, its output also presents a high impedance and only causes a negligible current through the signal terminals (101).

A receiving circuit (6) delivers, when the receiving circuit is in the activated state, p=4 "output signals of the receiving circuit" corresponding each to a transmission channel, the input of the receiving circuit being coupled to the m signal terminals (101) and to the common terminal (100). The "output signals of the receiving circuit" are delivered to the destination (3).

A common terminal switching circuit (9) has a return current terminal connected to said common terminal (100).

This third embodiment of an interfacing device of the invention comprises a termination circuit (4), the termination circuit being connected to the m signal terminals (101) and to the common terminal (100), the termination circuit being, when the termination circuit is in the activated state, approximately equivalent, for said signal terminals and said common terminal, to a linear (m+1)-terminal network such that, in the known frequency band used for transmission, the impedance matrix, with respect to said common terminal, of said (m+1)-terminal network is equal to a wanted non-diagonal matrix of size m×m. This wanted non-diagonal matrix of size m×m may be frequency-dependent. The termination circuit (4) and the receiving circuit (6) form a "Multichannel interfacing device having a termination circuit" disclosed in said French patent application Ser. No. 08/03876 and the corresponding international application.

In this third embodiment, each of said "output signals of the receiving circuit" is mainly determined by a linear combination of the voltages between one of said signal terminals and said common terminal, at least one of said linear combinations being such that two or more of the coefficients of said at least one of said linear combinations are not equal to zero.

Figure 6:
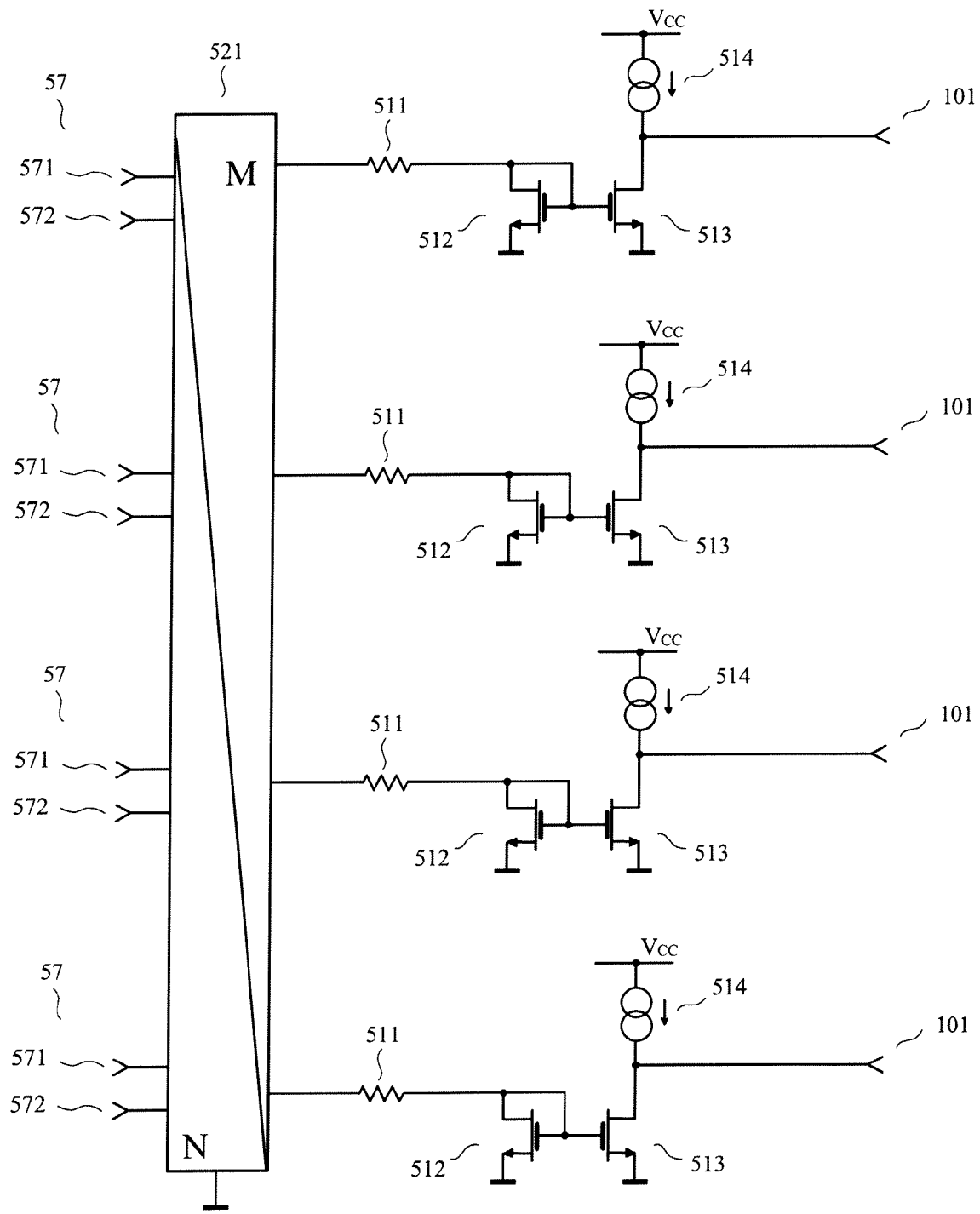
FIG. 6 shows the transmitting circuit used in the third embodiment.

The transmitting circuit (5) is shown in FIG. 6, in which:

each of the q "input signals of the transmitting circuit" is applied to an input (57) which is a differential input comprising two terminals (571) (572);

each of the q inputs (57) is connected to an input of a multiple-input and multiple-output signal processing device (521) having q inputs and m outputs;

each of the m outputs of said multiple-input and multiple-output signal processing device (521) corresponds to an input of a voltage-to-current converter (transconductor) comprising a resistor (511) connected to the input of a current mirror made of two n-channel transistors (512) (513);

the output of each of said current mirrors is biased by a current source (514) supplying a practically constant current;

each of the m signal terminals (101) is connected to the drain of the output transistor (513) of each of said current mirrors.

The specialist understands that the current sources (514) shown in FIG. 6 are ideal circuit elements which may be realized with real components, for instance using current mirrors.

Each output voltage of the multiple-input and multiple-output signal processing device (521) is a linear combination of signals each mainly determined by one and only one of said q "input signals of the transmitting circuit", at least one of said linear combinations being such that two or more of the coefficients of said at least one of said linear combinations are not equal to zero.

For instance, said multiple-input and multiple-output signal processing device (521) may be a multiple-input and multiple-output amplifier similar to one of the transmitting circuits described in said French patent number 0300064 and the corresponding international application, for instance one of the transmitting circuits shown in FIG. 7 or FIG. 9 of said French patent number 0300064 and the corresponding international application.

For instance, said multiple-input and multiple-output signal processing device (521) may be a digital signal processing device similar to one of the transmitting circuits described in said French patent number 0302814 and the corresponding international application, for instance the transmitting circuit shown in FIG. 2 of said French patent number 0302814 and the corresponding international application in the case where the "input signals of the transmitting circuit" are digital signals, or the transmitting circuit shown in FIG. 4 of said French patent number 0302814 and the corresponding international application in the case where the "input signals of the transmitting circuit" are analog signals.

We may now consider another use of interfacing devices of the invention, shown in FIG. 5, such that, at each end of the interconnection (1), we find an interfacing device of the third embodiment of the invention, comprising a transmitting circuit (5), a common terminal switching circuit (9), a receiving circuit (6) and a termination circuit (4).

The interconnection (1) and the two interfacing devices of the third embodiment of the invention shown in FIG. 5 are proportioned such that they form a device for pseudo-differential transmission using modal electrical variables disclosed in said French patent application Ser. No. 08/04429 and the corresponding international application. Consequently, a reduced echo and a reduced internal crosstalk are obtained.

Fourth Embodiment

A fourth embodiment of an interfacing device of the invention, given by way of non-limiting example, is intended for sending and receiving binary digital signals. This fourth embodiment also corresponds to the interfacing device of the invention shown in FIG. 4, comprising m=4 signal terminals (101) and a common terminal (100), the signal terminals (101) and the common terminal (100) being intended to be connected to an interconnection having m transmission conductors.

A transmitting circuit (5) receives q=4 "input signals of the transmitting circuit" coming from a source (2), the output of the transmitting circuit being coupled to the m signal terminals (101). The output of the transmitting circuit (5) is not coupled to the common terminal (100). The output of the transmitting circuit (5) delivers, when the transmitting circuit is in the activated state, m transmission variables, each transmission variable being a current flowing out of one of said signal terminals (101), each transmission variable being mainly determined by a linear combination of said q "input signals of the transmitting circuit", at least one of said linear combinations being such that two or more of the coefficients of said at least one of said linear combinations are not equal to zero. The transmitting circuit (5) is a multiple-input and multiple-output amplifier disclosed in the French patent application no. 06/00388 of 17 Jan. 2006 entitled "Amplificateur à entrées multiples et sorties multiples", corresponding to the international application no. PCT/IB2006/003950 of 19 Dec. 2006 (WO 2007/083191), entitled "multiple-input and multiple-output amplifier" or in the French patent application Ser. No. 08/03982 of 11 Jul. 2008 entitled "Amplificateur à entrées multiples et sorties multiples ayant des entrées pseudo-différentielles", corresponding to the international application no. PCT/IB2009/051358 of 31 Mar. 2009, entitled "multiple-input and multiple-output amplifier having pseudo-differential inputs".

A receiving circuit (6) delivers, when the receiving circuit is in the activated state, p=4 "output signals of the receiving circuit" corresponding each to a transmission channel, the input of the receiving circuit being coupled to the m signal terminals (101) and to the common terminal (100). The "output signals of the receiving circuit" are delivered to the destination (3). Each of said "output signals of the receiving circuit" is mainly determined by one and only one of the voltages between one of said signal terminals (101) and said common terminal (100). The receiving circuit (6) may be of any suitable known type of pseudo-differential receiver for digital signals, for instance one of the pseudo-differential receivers described in the U.S. Pat. No. 5,994,925 entitled "Pseudo-differential logic receiver" or in the U.S. Pat. No. 7,099,395 entitled "Reducing coupled noise in pseudo-differential signaling".

A common terminal switching circuit (9) has a return current terminal connected to said common terminal (100).

This fourth embodiment of an interfacing device of the invention comprises a termination circuit (4), the termination circuit being connected to the m signal terminals (101) and to the common terminal (100), the termination circuit being, when the termination circuit is in the activated state, approximately equivalent, for said signal terminals and said common terminal, to a linear (m+1)-terminal network such that, in the known frequency band used for transmission, the impedance matrix, with respect to said common terminal, of said (m+1)-terminal network is equal to a wanted non-diagonal matrix of size m×m. The termination circuit (4) and the receiving circuit (6) form a "Multichannel interfacing device having a termination circuit" disclosed in said French patent application Ser. No. 08/03876 and the corresponding international application.

We may now consider another use of interfacing devices of the invention, shown in FIG. 5, such that, at each end of the interconnection (1), we find an interfacing device of the fourth embodiment of the invention, comprising a transmitting circuit (5), a common terminal switching circuit (9), a receiving circuit (6) and a termination circuit (4).

The interconnection (1) and the two interfacing devices of the fourth embodiment of the invention shown in FIG. 5 are proportioned such that they form a device for pseudo-differential transmission using natural electrical variables disclosed in said French patent application Ser. No. 08/04430 and the corresponding international application. Consequently, a reduced echo and a reduced internal crosstalk are obtained.

INDICATIONS ON INDUSTRIAL APPLICATIONS

The interfacing device of the invention is suitable for pseudo-differential transmission between integrated circuits through an interconnection having two or more transmission conductors, the transmission presenting reduced unwanted couplings.

We note that, in the embodiment of an interfacing device of the invention, given above by way of non-limiting example and shown in FIG. 6, the active components are MOSFETs. This is not at all a characteristic of the invention, and specialists understand that it would have also been possible to use bipolar transistors or other types of active components. Consequently, the interfacing device of the invention may be implemented in integrated circuits made using any applicable manufacturing process.

The invention is suitable for the protection against the noise produced by unwanted electromagnetic couplings in printed circuit boards. The invention is particularly advantageous to printed circuit boards comprising wide-band analog circuits or fast digital circuits. For sending in q transmission channels, the invention has the advantage of only requiring q+1 pins on an integrated circuit providing the functions of the transmitting circuit, of the receiving circuit and of the common terminal switching circuit, as opposed to 2q pins in the case of a transceiver for differential transmission.

The interfacing device of the invention is particularly suitable for pseudo-differential transmission inside an integrated circuit, because it provides a good protection against the noise related to the currents flowing in the reference conductor and in the substrate of the integrated circuit.

An interfacing device of the invention may be built inside an integrated circuit, but this is not at all a characteristic of the invention. For instance, it could be interesting that the transmitting circuit, the receiving circuit and the common terminal switching circuit be built inside an integrated circuit, a termination circuit being built outside this integrated circuit.

Since the invention includes the possibility of a deactivated state for the terminals intended to be connected to said interconnection, for instance a high impedance state, the invention is suitable for an implementation in a data bus architecture.

The invention is particularly suitable for multilevel signaling, because this type of transmission scheme is more sensitive to noise than binary signaling.

The invention claimed is:

1. A device for transmitting signals through a plurality transmission channels, in a known frequency band, comprising:
   m signal terminals, a common terminal and a reference terminal, the signal terminals being intended to be connected to an interconnection having at least m transmission conductors, m being an integer greater than or equal to 2;
   a receiving circuit delivering, when the receiving circuit is in an activated state, p output signals of the receiving circuit corresponding each to a transmission channel, p being an integer greater than or equal to 1 and less than or equal to m, the input of the receiving circuit being coupled to at least p of the signal terminals and to the common terminal, each of the output signals of the receiving circuit being mainly determined by one or more of the voltages between one of the signal terminals and the common terminal;
   a transmitting circuit receiving q input signals of the transmitting circuit corresponding each to a transmission channel, q being an integer greater than or equal to 2 and less than or equal to m, the output of the transmitting circuit being coupled to each of the signal terminals, the output of the transmitting circuit delivering, when the transmitting circuit is in the activated state, m transmission variables, each of the transmission variables being either a voltage between one of the signal terminals and the reference terminal or a current flowing out of one of the signal terminals, each of the transmission variables being determined based on at least one of the input signals of the transmitting circuit, wherein at least one of the transmission variables is determined based on at least two of the input signals of the transmitting circuit; and
   a common terminal switching circuit having an open state and a closed state, the common terminal switching circuit having a return current terminal connected to the common terminal,
   wherein the common terminal switching circuit is in the closed state when the transmitting circuit is in the activated state,
   and wherein the common terminal switching circuit is in the open state when the receiving circuit is in the activated state,
   wherein, when the common terminal switching circuit is in the closed state, the common terminal switching circuit provides, between the common terminal and the reference terminal, a voltage that is approximately equal to the sum of a constant voltage and a voltage that is determined using the active sign convention and would appear across a first passive two-terminal circuit element subject to the current flowing from the return current terminal to the common terminal.

2. The device for transmitting signals of claim 1, wherein each of the transmission variables delivered by the transmitting circuit is a linear combination of signals each mainly determined by one and only one of the input signals of the transmitting circuit, at least one of the linear combinations being such that two or more of the coefficients of said at least one of the linear combinations are not equal to zero.

3. The device for transmitting signals of claim 1, wherein each of the transmission variables delivered by the transmitting circuit is mainly determined by a linear combination of the input signals of the transmitting circuit, at least one of the linear combinations being such that two or more of the coefficients of said at least one of the linear combinations are not equal to zero.

4. The device for transmitting signals of claim 1, wherein, in the open state, the common terminal switching circuit provides a current flowing from the return current terminal to the common terminal approximately equal to the sum of a constant current and of the current which would flow out of a second passive two-terminal circuit element subject to the voltage between the common terminal and the reference terminal, the product of the absolute value of the small-signal impedance of said first passive two-terminal circuit element at a first quiescent operating point, by the absolute value of the small-signal admittance of said second passive two-terminal circuit element at a second quiescent operating point being, in a part of the known frequency band, less than or equal to ½.

5. The device for transmitting signals of claim 4, wherein the common terminal switching circuit in the closed state is such that, at the first quiescent operating point, the first passive two-terminal circuit element has a small-signal impedance having, in the known frequency band, an absolute value less than or equal to three hundred ohms.

6. The device for transmitting signals of claim 1, wherein the small-signal impedance of the first passive two-terminal circuit element can be adjusted by electrical means.

7. The device for transmitting signals of claim 4, wherein the small-signal impedance of the second passive two-terminal circuit element can be adjusted by electrical means.

8. The device for transmitting signals of claim 1, wherein the device for transmitting signals constitutes a part of an integrated circuit, the interconnection being realized inside the integrated circuit.

9. The device for transmitting signals of claim 1, wherein the device for transmitting signals constitutes a part of an integrated circuit, each of the signal terminals being coupled to one or more pins of the integrated circuit, the common terminal being coupled to one or more pins of the integrated circuit.

10. The device for transmitting signals of claim 1, further comprising a termination circuit coupled to each of the signal terminals and to the common terminal, the termination circuit being, when the termination circuit is in the activated state, approximately equivalent, for the signal terminals and the common terminal, to a (m+1)-terminal network such that, at at least one quiescent operating point, for small signals in a part of the known frequency band, the impedance matrix, with respect to the common terminal, of the (m+1)-terminal network is equal to a wanted matrix of size m×m.

11. The device for transmitting signals of claim 10, wherein the impedance matrix, with respect to the common terminal, of the termination circuit in the activated state can be adjusted by electrical means.

12. The device for transmitting signals of claim 10, wherein the termination circuit has an activated state and a deactivated state, each current flowing from the termination circuit to one of the signal terminals being substantially zero when the termination circuit is in the deactivated state.

* * * * *